Nov. 1, 1960  R. A. HIGONNET ET AL  2,958,270
MEANS FOR TYPE COMPOSITION
Filed Oct. 1, 1957  4 Sheets-Sheet 1

INVENTORS
RENE A. HIGONNET
LOUIS M. MOYROUD

KENWAY, JENNEY, WITTER & HILDRETH

ATTORNEYS

INVENTORS
RENE A. HIGONNET
LOUIS M. MOYROUD
BY
KENWAY JENNEY, WITTER & HILDRETH
ATTORNEYS

United States Patent Office 2,958,270
Patented Nov. 1, 1960

2,958,270

MEANS FOR TYPE COMPOSITION

Rene A. Higonnet, Cambridge, and Louis M. Moyroud, West Medford, Mass., assignors to Graphic Arts Research Foundation, Inc., Cambridge, Mass., a corporation of Delaware.

Filed Oct. 1, 1957, Ser. No. 687,573

Claims priority, application France June 6, 1950

8 Claims. (Cl. 95—4.5)

The present invention relates generally to type composition. More particularly, it concerns apparatus for spacing lines of text matter in photocomposition and for visual indication of page make-up. This application continues in part our application Serial No. 452,814 (now abandoned), filed August 30, 1954, as a division of our application Serial No. 229,804, filed June 4, 1951, now Patent No. 2,787,199.

In photocomposing machines of the type described in our Patent No. 2,790,362, wherein the characters in each line are individually and successively photographed upon a film in a light-tight enclosure, it is desirable to provide means for visual indication of the page make-up. One of the objects of this invention is to provide such means in the form of a mechanical device adapted to represent visually the positions of lines as photographed upon the film through selective operation of a keyboard.

A related object is to provide a device upon which a make-up sheet may be laid, whereby the operator may set the type to accommodate cuts, provide special marginal effects, or accomplish any other similar arrangement of the margins of lines of text in the page.

A further object is to provide controls for special composing operations such as the photography of vertical rules.

With the foregoing and other objects in view, the features of the invention include an improved page make-up device. This device is provided with marginal indexes which are coupled with the spacing apparatus of the machine to indicate the progress of composition.

Another feature resides in the provision of controls for the page make-up device and for the film leading mechanism as herein described. It will be understood that the term "leading" as herein used refers generally to the operation whereby the successive lines in a page are spaced, and is measured in suitable terms such as points or picas in accordance with usual typographical practice.

Other features of the invention include certain features of construction, controls for and operative relationships between the various parts, and modes of operation which will be more fully understood from the following description of a preferred embodiment thereof, with reference to the appended drawings illustrating the same.

Figure 1:
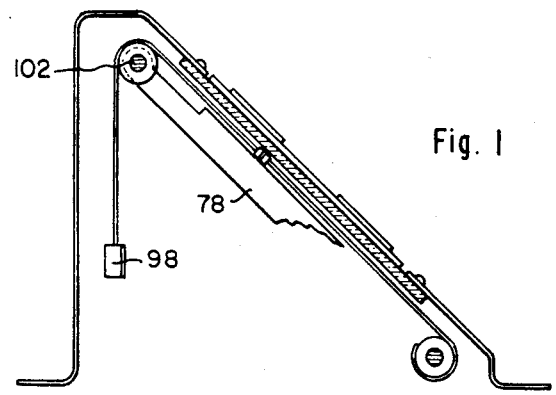
Figs. 1 and 2 are side and front elevations, respectively, of the page make-up device.
Figure 2:
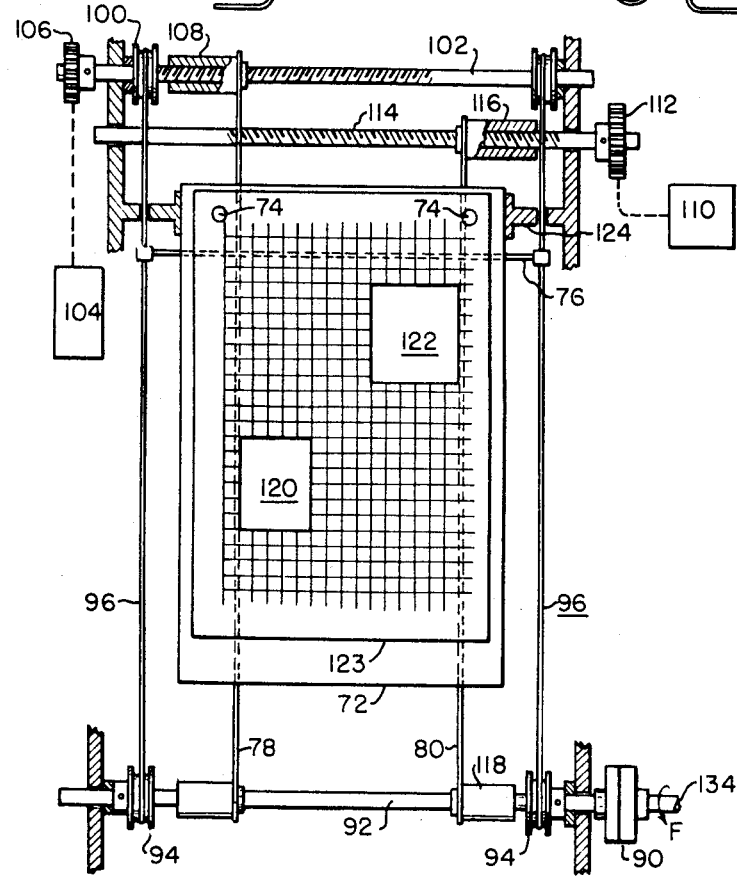

Referring to Figs. 1 and 2, the page indicator comprises a frame 70 provided with a window 72 of transparent material with two registering pins 74. One index 76, made for instance of a thin steel blade or a transparent rule scaled in suitable space units such as points or picas, can be moved in parallel fashion and very close to the window 72. As shown on the drawing, this index can move upwards and downwards. A second similar index 78, which is perpendicular to the first one, can also be displaced in parallel fashion from left to right and right to left. Finally a third index 80, parallel to the index 78, can be displaced from right to left and left to right. These three indexes are located as close as possible to the lower surface of the transparent plate 72 so as to be seen clearly from above.

The horizontal index 76 is controlled by a line spacing mechanism described more fully below. The mechanism is connected through a friction clutch 90 with a shaft 92 on which are mounted drums 94. These drums are provided with steel tapes, belts or cords 96. When the line spacing mechanism is operated, it causes the shaft 92 to rotate in the direction of arrow F, and the cords 96 are wound around the drums 94, thus causing the index 76 to move downwards. The cords 96 are attached at their ends to weights 98 and pass over pulleys 100 which can rotate freely about an upper shaft 102. It is obvious that coil springs or continuous tapes may be used in place of the weights 98.

The left marginal index 78 is controlled by the left marginal control mechanism indicated diagrammatically by the block 104. This mechanism may be of the form illustrated in Fig. 4 of our application Serial No. 187,752, now Patent No. 2,664,986. Upon release of the pulleys 66 and 68 of said application they move to a point to determine the desired space in the line. For purposes of the present invention, they are arranged to provide the desired space at the left. They are connected through a pinion 106 to drive the shaft 102 in the appropriate direction. Part of the length of the shaft is threaded and bears a threaded sleeve or nut 108 attached to one end of the index 78. The other end of this index is provided with a sliding sleeve which can move freely on the rod 92. Rotation of the shaft 102 will cause a displacement of the index 78.

The right marginal index 80 is controlled by the mechanism for adjusting the length of the justified line. This mechanism is illustrated by the block 110, which is preferably of the form shown at 148, 150, 152, 154 in Fig. 1 of our Patent No. 2,664,986. It is connected through a pinion 112 with a threaded shaft 114 which drives a sleeve 116 attached to one end of the index 80. The other end of this index is fixed to a guiding sleeve 118 on the shaft 92.

The control mechanism of these three indexes is designed in such a way that (1) the horizontal index moves downwardly at the end of transcription of a line by a distance equal to the length by which the film is moved to position it for the transcription of the next line; (2) the index 78 is controlled by the left hand margin adjustment mechanism, and (3) the index 80 moves when the justification is changed so as always to be in a position representing the end of the composed line.

These three indexes enable the operator to see at any instant where the line is which he is composing on the page, where it begins and where it ends.

The manner in which this indicator can be used will now be described. One of the principal advantages of this indicator is the possibility of composing directly full pages while leaving the necessary empty spaces for cuts (figures, mathematical formulae and other illustrations). It also makes it possible to avoid so-called widow lines by warning the operator when this is going to happen and thus enable him to recompose the page or the paragraph immediately with slight changes in the line spacing or the number of words in the line. An example of a page comprising two cuts 120 and 122 will be described. First of all, at the beginning of his work the operator places on registering pins 74 a transparent sheet 123 provided with vertical lines and calibrated from left to right in justification units (for instance picas); the sheet is also provided with horizontal lines calibrated from top to bottom in line spaces. The cuts to be placed on the page are represented by pieces of paper or of a plastic substance attached to the sheet, and the pieces are of the same size as the cut to be left for the illustrations. These figures can be prepared in advance and are numbered in the order of the illustrations. On the text given to the operator mention is made of the position where the illustrations are to be placed.

At the beginning of the composition of one page, the horizontal index 76 is at rest against an abutment 124. The operator adjusts the left hand margins so as to have, between the indexes 78 and 80, a distance equal to the desired length of line. Composition of the first line of the page begins and the selected characters and other information are stored in a register. When the operator depresses the "end of line" key to bring the platen of the typewriter back the line is sent from the register to the photographic unit and mechanism described below is operated to displace downwardly the index 76 to show the operator where the next line to be composed will be.

The operator then continues the composition until he reaches the area where the cut 122 is to be inserted. He operates the justification control until the index 80 reaches the left hand extremity of the piece 122. The operator proceeds to compose the text with this new justification until the index 76 has passed the lower edge of the paper 122. He then returns to the normal justification length for a full line. In the case of the cut 120, the procedure is similar except that the operator uses the left hand margin control instead of the justification knob.

The above process makes it possible to provide empty spaces of any shape and at any position on the page, as well as captions under the figures, the folios, footnotes, etc. When the operator has finished composing the last line of the page and when he desires to go on to the next page, he releases the clutch 90 and the index 76 then comes back against its abutment 124 under the action of the weights 98.

We turn next to a description of the leading apparatus including the mechanism for moving the film and for rotation of the shaft 92, this shaft in turn moving the horizontal index 76. It will be understood that this index is independent of the marginal indexes and may be used in conjunction with them, as illustrated, or alone.

Figure 3:
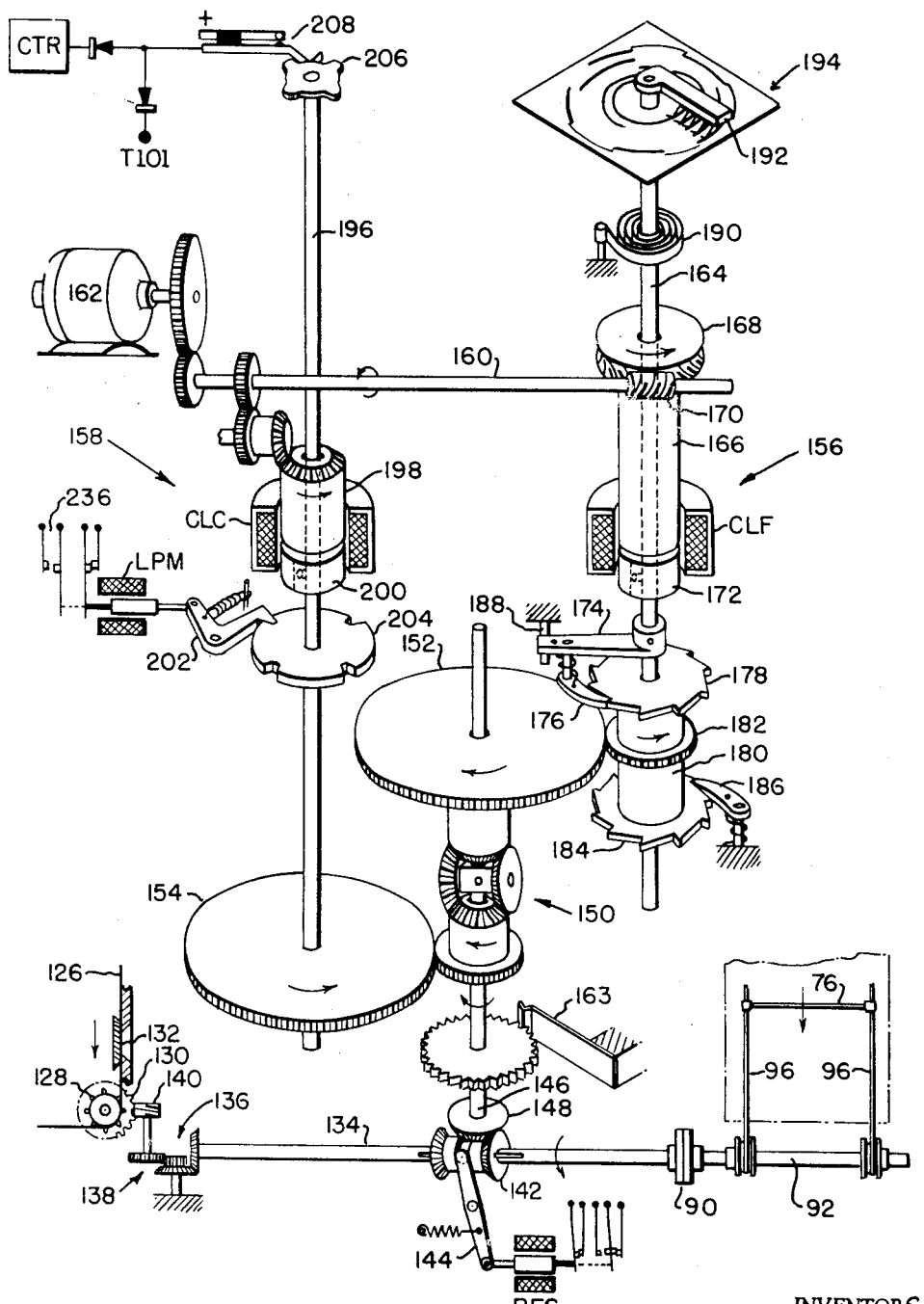
Fig. 3 is an oblique view of the mechanism for moving the film and horizontal index of the page make-up device.

Referring to Fig. 3, a strip of film 126 is mounted in a light-tight box and is engaged by a sprocket wheel 128 driven by a worm gear 130. A transverse strip of film is presented at a window 132 and remains stationary while the characters forming each line are successively exposed thereon. Following the composition of each line the film is leaded a predetermined distance to present the next strip for exposure. This is accomplished by a predetermined adjustable displacement of a shaft 134 through bevel gears 136, spur gears 138 and a worm 140 engaged with the gear 130.

The shaft 92 is also engaged through the friction clutch 90 with the shaft 134. A sleeve 142 having integral oppositely-facing bevel gears is splined to the shaft 134 and is provided with an annular groove to receive an end of a reversing lever 144. The lever 144 is operated by a reversing solenoid RES. Thus the direction of rotation of the shaft 134 when driven from an output shaft 146 through a bevel gear 148 may be reversed.

The output shaft 146 is driven by a differential 150 having additive input gears 152 and 154. The gear 152 is engaged with a fine leading mechanism designated generally as 156 and the gear 154 is engaged with a coarse leading mechanism 158. These mechanisms are independently engageable with a continuously rotating shaft 160 driven through spur gearing by a motor 162. A ratchet 163 on the shaft 146 holds it steady when leading is not in progress.

The construction of the fine leading mechanism includes a shaft 164 extending freely through a sleeve 166 having an integral worm gear 168, this gear engaging a worm 170 secured on the shaft 160. Thus the sleeve 166 turns continuously. A sleeve 172 is splined to the shaft 164 and engages the sleeve 166 magnetically when a clutch magnet CLF is energized. A pawl arm 174 is pinned to the shaft 164 and pivotally supports a pawl 176. The pawl engages a ratchet wheel 178 which is secured by a sleeve 180 to a gear 182 and a second ratchet wheel 184. The sleeve 180 is free on the shaft 164. A pawl 186 is resiliently engaged with the teeth of the wheel 184 and has a fixed pivot. To rotate the gear 182 the magnet CLF is energized to engage the shaft 164 with the shaft 160. The shaft 164 rotates the pawl arm 174 away from a fixed abutment 188, and the pawl 176 turns the wheels 178 and 184 and the gear 182. Rotation continues for a predetermined fraction of a revolution of the shaft 164, at which time the magnet CLF is deenergized. Once the shaft 164 is disengaged, a coil spring 190 which has been wound up by the rotation returns the shaft until the pawl arm 174 reaches the abutment 188. The gear 182 does not follow this return motion, however, because the pawl 186 is engaged with the wheel 184.

Apparatus to cause the desired rotation of the gear 182 in the above manner includes a brush arm 192 and a code card 194. Details of these parts appear below.

The construction of the coarse leading mechanism includes a shaft 196 extending freely through a sleeve 198 having bevel teeth at one end engaged through spur gearing with the shaft 160. Thus the sleeve 198 turns continuously. A sleeve 200 is splined to the shaft 196 and is engageable magnetically with the sleeve 198 when a clutch magnet CLC is energized. When the shaft 196 is not rotating it is held fast by a pawl 202 engaging one of four notches on a wheel 204. The pawl 202 may be removed from the notch by energizing a locking pawl magnet LPM.

The dimensions of the apparatus are arranged so that one complete revolution of the fine leading shaft 164 produces one point of film leading, and one complete revolution of the shaft 196 produces four points of film leading. In a given leading movement, both shafts are ordinarily rotated and their rotations are added in the differential device 150. The shaft 196 may rotate more than one revolution and its rotation is controlled by a cam 206 adapted to close contacts 208 once for each point of leading.

*Normal leading*

Figure 4:
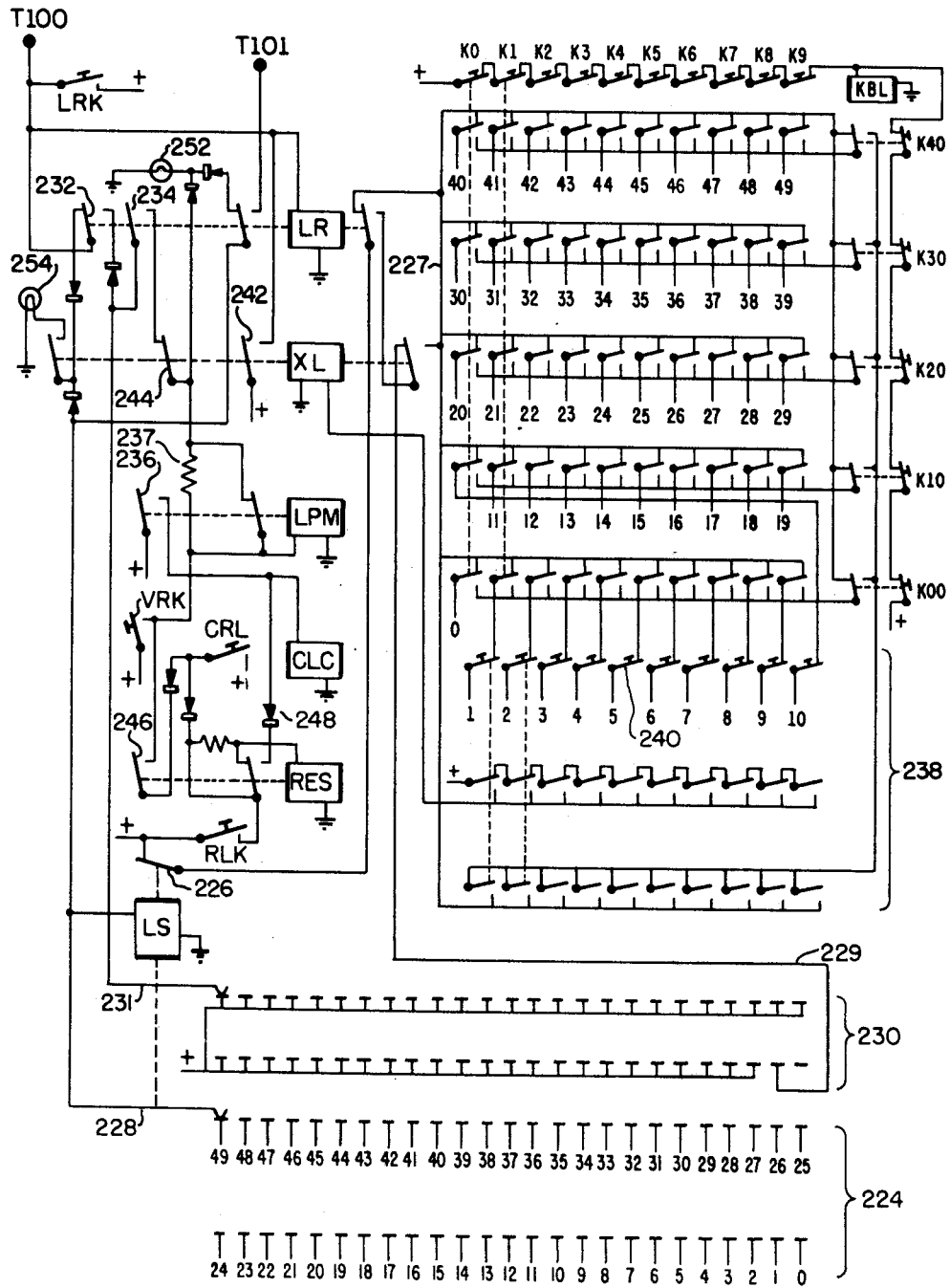
Fig. 4 is a schematic circuit diagram of the apparatus for controlling the coarse leading produced by the mechanism of Fig. 3.
Figure 5:
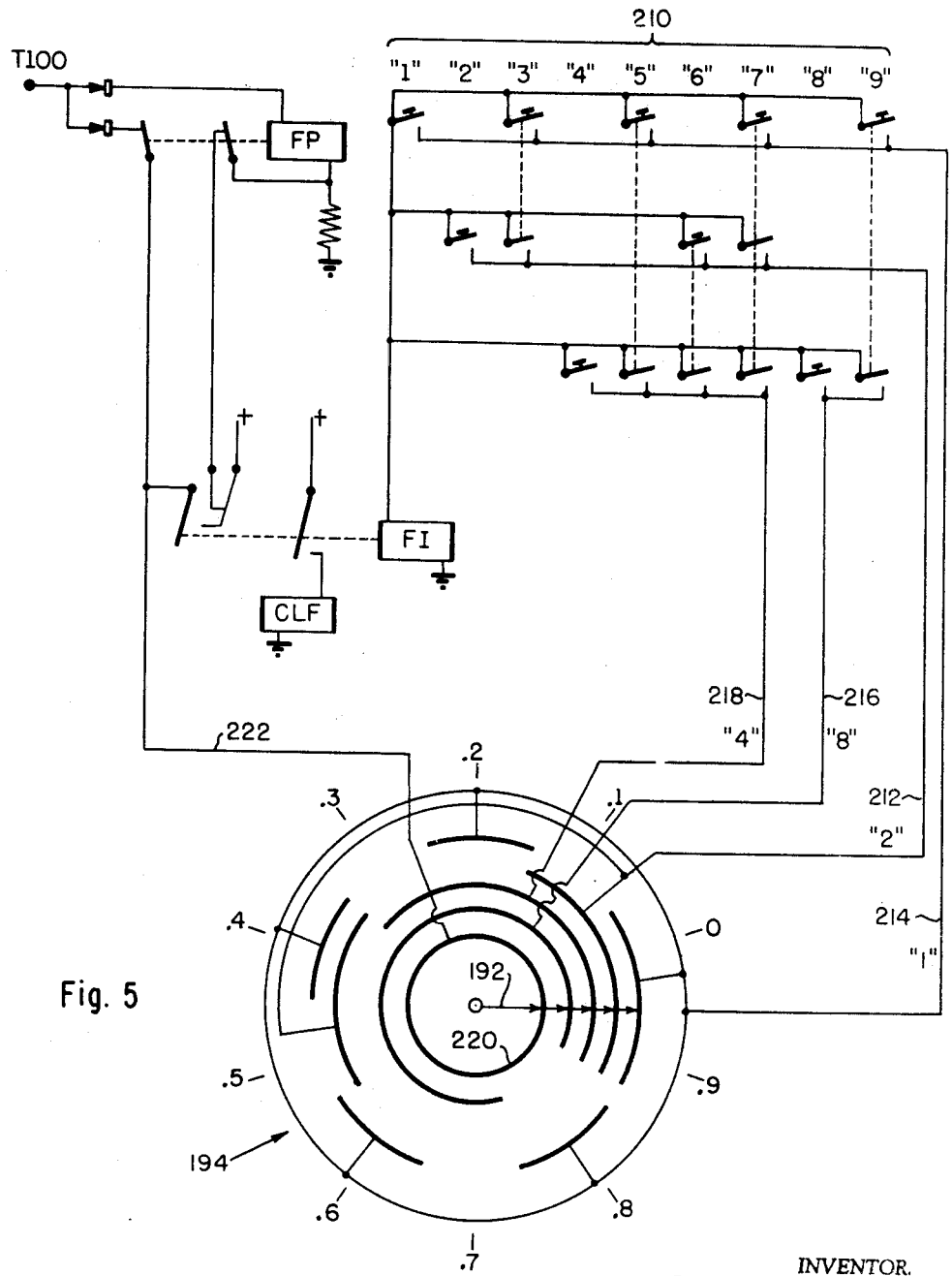
Fig. 5 is a circuit diagram of the apparatus for controlling the fine leading produced by said mechanism.

The circuits to control the operations of the leading apparatus are shown in Figs. 4 and 5, all relays being shown in their unenergized positions. These operations are preferably initiated by an "end-of-line" code stored in the register following the last character in the line. This code gives rise to a voltage at a terminal T100 (Figs. 4 and 5) represented as being applied by closing a leading repeat key LRK. This simultaneously initiates the fine and coarse leading movements.

The fine leading movement is controlled by a set of nine keys 210 representing tenths of a point of leading. The keys have make contacts representing the respective decimal values in binary form and the contacts are connected with the stationary code card 194 having selected conductive areas. Connections are made to sectors of the card having corresponding binary values, whereby ten sectors are defined and for each combination of wires 212, 214, 216 and 218 that is energized there is a corresponding sector on which the brush arm 192 will not connect the voltage to a common ring 220. This latter ring is connected to a lead 222. The brush arm is shown in its position in which the pawl arm 174 is against the stop 188.

Assume, for example, that the key representing ".5" is depressed. Upon energization of the terminal T100 a voltage is connected to a coil terminal of a relay FP, but since its other terminal is supplied with the same voltage through break contacts of a relay FI the relay FP is not energized at this time. The voltage also passes over the lead 222, through the "4" and "1" sectors of the card 194, the leads 214 and 218 and the contacts of the key representing ".5" to energize a relay FI. This relay through make contacts energizes the fine leading clutch magnet CLF (Fig. 3) which causes the brush 192 to begin turning. The relay FI also breaks the short-circuit on the relay FP allowing it to become energized and to open the energizing circuit for the relay FI from the terminal T100. Until the operation is completed the relay FI holds through its own make contacts, the code card levels and the keys 210.

When the brush arm 192 reaches the sector on which no connection is made between the lead 212 and either the lead 214 or the lead 218, the relay FI becomes deenergized to release the clutch magnet CLF. At this moment the pawl 186 will have passed over the fifth tooth which is 0.5 revolution from the starting tooth. When the brush arm is returned to its starting position the pawl positively engages the fifth tooth. Thus a leading of precisely 0.5 point is produced.

The normal coarse leading movement is controlled by a set of five bistable "tens" keys K00, K10, K20, K30 and K40 and ten bistable "units" keys K0 to K9. The numerical designations of these keys equal the leading values produced when they are operated. Thus the value "23" points is produced by depressing the keys K20 and K3 ad the value "48" points by depressing the keys K40 and K8. The blades operated by the "units" keys are connected by leads "1" to "49" to correspondingly numbered leads on contacts of a level 224 of a 50-position, two-level stepping switch LS of the type which steps when the energizing voltage is removed. The initial or preset position of this switch when leading begins is that position which is removed from the position at the lead "0" by the same number of steps as the preset value represented by the depressed "tens" and "units" keys. Thus if the value "23" is selected for example, the initial position is on the contact connected to the lead "23."

The circuit by which the switch LS reaches the preset position extends from its self cycling contacts 226 which open when the energizing voltage is applied, through break contacts on a relay LR through a lead 227 connected to the break contacts of the "units" and "tens" keys, through the blades of the "tens" and "units" keys and the leads "1" to "49", through the brush 228 on the level 224 to the operating coil of the switch. In the case of those "units" keys that are not depressed the corresponding blades are energized through their break contacts. In the case of that "units" key which is depressed, the corresponding blade on each "tens" level of the key is energized through a make contact of the "units" key and a break contact of the corresponding "tens" key, except for the blade on the level of a depressed "tens" key. This blade alone will fail to connect the lead 227 in the self-cycling circuit to a contact of the switch LS. Therefore, the switch self-cycles until it reaches this contact. The switch is thus stepped automatically to its preset initial position where it remains until the key LRK is closed to initiate a leading operation.

The operations which are initiated by closure of the key LRK include connection of the cam contacts 208 (Fig. 3) through a terminal T101 to step the switch LS once for each point of leading added until it reaches its last position. Thus the preset value determines the points of leading added. The circuit details are as follows:

Closure of the key LRK energizes the relay LR which (a) transfers the operating coil of the switch LS to the terminal T101, (b) disconnects the self-cycling contacts 226 of the switch LS from the key contacts and connects them by a lead 229 to the 49th position of a level 230 of the switch LS having a brush 231, (c) holds through its contacts 232 and said level 230, and (d) connects said level 230 through make contacts 234 to energize the coarse leading pawl magnet LPM. (See also Fig. 3.) When the pawl has been removed from a notch on the wheel 204 make contacts 236 close to energize the coarse leading clutch solenoid CLC. Rotation of the shaft 196 now begins, the cam contacts 208 send an impulse for each point of leading produced through the terminal T101 to step the switch LS, and each such impulse is counted in a conventional impulse counter CTR.

The stepping process continues until eventually the brush 231 makes contact with the lead 229. In this position of the switch LS the pawl magnet LPM holds through break contacts of a relay XL, the contacts 234, the brush 231, the lead 229, additional break contacts of the relay XL, make contacts of the relay LR and the self-cycling break contacts 226.

When the next cam impulse which steps the switch LS to its last position arrives, the holding circuit for the magnet LPM is opened by the contacts 226 and the pawl 202 drops on the disk 204 between two notches. Quick release of the magnet LPM is insured by insertion of a series resistor 237 after the magnet is energized, according to a conventional technique. This movement of the pawl is not sufficient to open the contacts 236 connected to the coil CLC. Rotation continues until the pawl 202 falls in the next notch, at which moment the clutch coil CLC is deenergized.

As stated above, the relay LR holds on the level 230 of the switch LS through its contacts 232. This holding circuit opens as the switch LS steps to its last position. At this time, or as soon thereafter as the voltage at the terminal T100 is removed, the relay LR becomes deenergized and reconnects the self-cycling contacts 226 of the switch LS through the "units" and "tens" keys and the level 224 to the operating coil of the switch. The switch then returns to its initial, preset position.

*Additional leading*

In typical composition work, certain recurring text passages such as paragraphs, sections or chapters are set off from one another by additional leading, that is, leading in addition to the normal leading employed between two lines in an ordinary paragraph. It is desirable to be able to insert the additional leading without disturbing the "units" and "tens" keys which are ordinarily set for normal leading. To this end we employ a set of ten additional leading keys 238 which are spring-biased to the positions illustrated (Fig. 4). When additional leading is desired the operator allows the normal leading operation described above to be completed. Then, a selected key 238 is depressed. For example, assume that a key 240 representing additional leading of "5" points is depressed and held down. This energizes the relay XL, opens the connection of the lead "5" to the level 224 of the switch LS, and connects the make contacts of the "tens" keys to the break contacts of the "units" keys. The later two connections, it will be seen, cause the lead associated with the selected additional leading key to become disconnected from its corresponding contact on the switch LS, while causing all contact blades of the "units" keys to be connected in the self-cycling circuit irrespective of the "tens" and "units" selection.

When the relay XL is energized it closes its make contacts 242 to energize the relay LR, opens its break contacts 244 in the energizing circuit of the pawl magnet LPM, and connects a circuit from the self-cycling contacts 226 of the switch LS through make contacts of the relays LR and XL to the break contacts of the "units" keys. The latter connection establishes a circuit whereby the switch LS immediately steps until its brush 228 connects with the lead "5" where it stops, the operation being similar to that of self-cycling to the "units" and "tens" preset position as described under the previous heading.

The key 240 is then released to deenergize the relay XL. The relay LR remains energized, however, being held through its make contacts 232 and the level 230 of the switch LS. The circuit is thus established in the condition which follows closure of the key LRK in normal leading, and the switch LS steps to its last position, adding five points of leading to the film.

Continuous leading

In copending application Serial No. 687,572 of Higonnet, Moyroud and Hanson, filed on even date herewith, there is described a key VRK which is associated with a continuous film drive mechanism 178 as shown in Fig. 6 thereof. In Fig. 4 hereof, we show this same key VRK associated with the preferred form of leading mechanism. It will be understood that the other circuits associated with this key are as described in said application.

When the key VRK is depressed it energizes the pawl magnet LPM, which in turn energizes the clutch magnet CLC. The coarse leading input will therefore be continuous until the key VRK is released. It will be understood that in any case, since the clutch magnet is not deenergized until the pawl 202 falls into a notch, the added leading will be an integral number of points.

Reverse leading

A bistable key RLK provides means to cause reverse leading. When it is depressed the reversing solenoid RES (see also Fig. 3) is energized. Except for the reversal of displacements transmitted to the film and page indicator, the various leading operations may be carried out as described. Thus reverse leading of a predetermined amount may be produced each time the key LRK is closed.

Continuous reverse leading may also be carried out by depressing a key CRL, which is spring-biased open, the key RLK being left open. Closure of the key CRL energizes the magnet RES and through make contacts 246 of the latter energizes the pawl magnet LPM. Make contacts 236 of the latter energize the clutch magnet CLC. It will be observed that this arrangement insures the proper sequence: reverse the gearing 142, 148, lift the pawl 202, and energize the clutch CLC. Reverse leading is continuous while the key CRL is held down. When it is released the pawl magnet LPM is deenergized immediately. However, the contacts 236 do not open until the pawl 202 falls into a notch. Then, the clutch magnet CLC is deenergized. Until the magnet CLC is deenergized the magnet RES holds through a rectifier 248, thus insuring the proper sequence: release the pawl 202, deenergize the clutch CLC and change the reverse gearing 142, 148. Thus jamming of the mechanism is prevented. Quick release of the relay RES is insured by insertion of a resistance 250 in series with it after it has become energized, in accordance with a convention technique.

Indicating lamps

Lamps 252 and 254 are provided to indicate the momentary condition of the above-described leading circuits. The lamp 252 is lighted whenever the magnet LPM is energized (during actual leading of the film) and whenever the switch LS is self-cycling on its level 224 to a preset position for normal leading (when the relay LR is unenergized). Thus it is a "leading-in-process lamp" which indicates that no operations should be initiated until it goes out.

The lamp 254 is lighted while any "additional leading" key 238 is held depressed and the switch LS is self-cycling to the position corresponding to such key. The key should not be released until this lamp goes out.

Keyboard locking

The leading operations described above are necessary for proper photocomposition of successive lines on the film. To insure that two lines will not be superimposed on the film a magnet KBL is provided. Unless a "units" key and a "tens" key is depressed, this magnet is energized through series break contacts of the keys to lock the keyboard so that no keys can be depressed. The actual locking mechanism is of a conventional form.

It will be understood that while the invention has been described above with reference to a preferred embodiment thereof, various modifications of and changes in the circuits and connections of the parts may be employed according to techniques familiar to those skilled in the art. These changes may be accomplished without departing from the spirit or scope of the invention.

Having thus described the invention, we claim:

1. In combination with a photocomposing machine having a left marginal control mechanism and a mechanism for adjusting the length of a justified line, a make-up apparatus comprising a fixed frame to carry a sheet corresponding to a page on which printed matter is to be composed, a vertically-movable horizontal index, a left marginal index and a right marginal index, a variable escapement mechanism for driving the horizontal index to indicate the line spacing of the composed matter, driving means for the left and right marginal indexes, and connections between said mechanisms of the photocomposing machine and said driving means to position said indexes automatically with respect to said sheet to indicate the positions of the margins of the composed matter.

2. In combination with a photocomposing machine having a left marginal control mechanism, a mechanism for adjusting the length of a justified line and line spacing mechanism, a make-up apparatus comprising a fixed frame to carry a sheet corresponding to a page on which printed matter is to be composed, a vertically movable horizontal index, a left marginal index and a right marginal index, a variable escapement driving means for driving the horizontal index to indicate the line spacing of the composed matter, driving means for the left and right marginal indexes, and connections between said mechanisms of the photocomposing machine and said driving means to position said indexes automatically with respect to said sheet to indicate the positions of the margins and the columnwise position of the composed matter.

3. In type composing apparatus, the combination of a make-up apparatus comprising a fixed frame to carry a sheet, a vertically-movable horizontal index to indicate the line spacing of composed matter, and a drive for said index including a coarse leading variable escapement device, a fine leading escapement device and means to transmit motion to said index proportional to the sum of the motions of said indexes.

4. In photocomposing apparatus, the combination of means to support a sensitized film, a leading mechanism for the film, a make-up apparatus comprising a fixed frame to carry a sheet, a vertically-movable horizontal index to indicate the line spacing of composed matter on the sheet and a drive connected with the leading mechanism and index.

5. In photocomposing apparatus, the combination of means to support a sensitized film, a leading mechanism for the film, a make-up apparatus comprising a fixed frame to carry a sheet, a vertically-movable horizontal index to indicate the line spacing of composed matter on the sheet, and a drive connected with the leading mechanism and index to displace the index proportionately to a selected, variable value of leading produced by the leading mechanism.

6. In photocomposing apparatus, the combination of means to support a sensitized film, a leading mechanism for the film, a make-up apparatus comprising a fixed frame to carry a sheet, a vertically-movable horizontal index to indicate the line spacing of composed matter on the sheet, and a drive connected with the leading mechanism and index, said drive including a continuously rotatable driving shaft, a driven shaft, cam-operated contacts associated with the driven shaft, a counter associated with said contacts, and a clutch for engaging the driving and driven shafts.

7. In type composing apparatus, the combination of means to support a sensitized film, a leading mechanism for the film, a drive connected to the leading mechanism, a make-up apparatus comprising a fixed frame to carry a sheet corresponding to a page on which printed matter is to be composed, a vertically-movable horizontal index, and means engageable with the leading mechanism to drive the horizontal index and to position said index automatically with respect to said sheet to indicate visually the line spacing of the composed matter.

8. In type composing apparatus, the combination of means to support a sensitized film, a variable motion drive connected to the leading mechanism and adapted to produce a selected variable leading movement of the film, a make-up apparatus comprising a fixed frame to carry a sheet corresponding to a page on which printed matter is to be composed, a vertically-movable horizontal index, and means engageable with the leading mechanism to drive the horizontal index and to position said index automatically with respect to said sheet to indicate visually the line spacing of the composed matter.

References Cited in the file of this patent

UNITED STATES PATENTS

| | | |
|---|---|---|
| 1,564,879 | Mathews | Dec. 8, 1925 |
| 1,655,428 | Mathews | Jan. 10, 1928 |
| 1,893,439 | Ogden | Jan. 3, 1933 |
| 1,980,287 | Ogden | Nov. 13, 1934 |
| 2,504,527 | Huebner | Apr. 18, 1950 |
| 2,642,040 | Turner | June 16, 1953 |
| 2,697,378 | Sexton | Dec. 21, 1954 |
| 2,791,162 | Snyder | May 7, 1957 |